United States Patent
Nicholson et al.

(10) Patent No.: US 11,064,297 B2
(45) Date of Patent: Jul. 13, 2021

(54) MICROPHONE POSITION NOTIFICATION

(71) Applicant: Lenovo (Singapore) Pte. Ltd., Singapore (SG)

(72) Inventors: John Weldon Nicholson, Cary, NC (US); Howard Locker, Cary, NC (US); Daryl Cromer, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 16/545,822

(22) Filed: Aug. 20, 2019

(65) Prior Publication Data

US 2021/0058706 A1 Feb. 25, 2021

(51) Int. Cl.
*H04R 5/04* (2006.01)
*G06F 9/54* (2006.01)
*G10L 25/51* (2013.01)
*H04R 5/033* (2006.01)

(52) U.S. Cl.
CPC ............... *H04R 5/04* (2013.01); *G06F 9/542* (2013.01); *G10L 25/51* (2013.01); *H04R 5/033* (2013.01)

(58) Field of Classification Search
CPC combination set(s) only.
See application file for complete search history.

(56) References Cited

U.S. PATENT DOCUMENTS

| | | | |
|---|---|---|---|
| 9,678,850 B1* | 6/2017 | Rickard | G06F 11/328 |
| 10,083,006 B1* | 9/2018 | Feuz | G06N 20/00 |
| 10,085,101 B2* | 9/2018 | Hardek | H04R 29/004 |
| 10,178,485 B2* | 1/2019 | Lee | H04R 1/1041 |
| 10,455,328 B2* | 10/2019 | Moova | H04R 3/00 |
| 10,687,145 B1* | 6/2020 | Campbell | G10K 11/17821 |
| 2010/0324891 A1* | 12/2010 | Cutler | G10L 25/78 |
| | | | 704/210 |
| 2011/0254954 A1* | 10/2011 | Lee | H04R 1/08 |
| | | | 348/142 |
| 2014/0278387 A1* | 9/2014 | DiGregorio | G10L 15/20 |
| | | | 704/231 |
| 2015/0156416 A1* | 6/2015 | Filip | H04N 5/23238 |
| | | | 348/36 |
| 2017/0188167 A1* | 6/2017 | Li | H04R 29/004 |
| 2018/0130194 A1* | 5/2018 | Kochura | G06T 7/20 |
| 2018/0286422 A1* | 10/2018 | Liang | G10L 25/51 |
| 2019/0020952 A1* | 1/2019 | Moova | G06F 3/167 |
| 2020/0008708 A1* | 1/2020 | Tan | H04R 1/1041 |

* cited by examiner

*Primary Examiner* — Fan S Tsang
*Assistant Examiner* — Angelica M McKinney
(74) *Attorney, Agent, or Firm* — Ference & Associates LLC

(57) ABSTRACT

One embodiment provides a method, including: identifying, using at least one sensor, that a position of a microphone attached to a headset is associated with an audible input position; determining, using a processor, that the position is not associated with an optimal audible input position; and notifying, responsive to the determining, a user that the position is not associated with the optimal audible input position. Other aspects are described and claimed.

7 Claims, 4 Drawing Sheets

MICROPHONE POSITION NOTIFICATION

BACKGROUND

Individuals frequently wear headphones, or headsets, while interacting with their information handling devices ("devices"), for example, smart phones, tablet devices, laptop and/or personal computers, and the like. Many headsets comprise an integrated boom microphone (e.g., located on a side of the headset, etc.) that a wearer may adjust (e.g., up and down, forward and back, etc.). The presence of the integrated boom microphone provides a convenient way for users to provide audible input to a device and/or to engage in conversations with others.

BRIEF SUMMARY

In summary, one aspect provides a method, comprising: identifying, using at least one sensor, that a position of a microphone attached to a headset is associated with an audible input position; determining, using a processor, that the position is not associated with an optimal audible input position; and notifying, responsive to the determining, a user that the position is not associated with the optimal audible input position.

Another aspect provides an information handling device, comprising: at least one sensor; a processor; a memory device that stores instructions executable by the processor to: identify that a position of a microphone is associated with an audible input position; determine that the position is not associated with an optimal audible input position; and notify, responsive to the determining, a user that the position is not associated with the optimal audible input position.

A further aspect provides a method, comprising: identifying, using at least one sensor, that a position of a microphone attached to a headset is associated with an out-of-way position; and performing, responsive to the identifying, an action.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
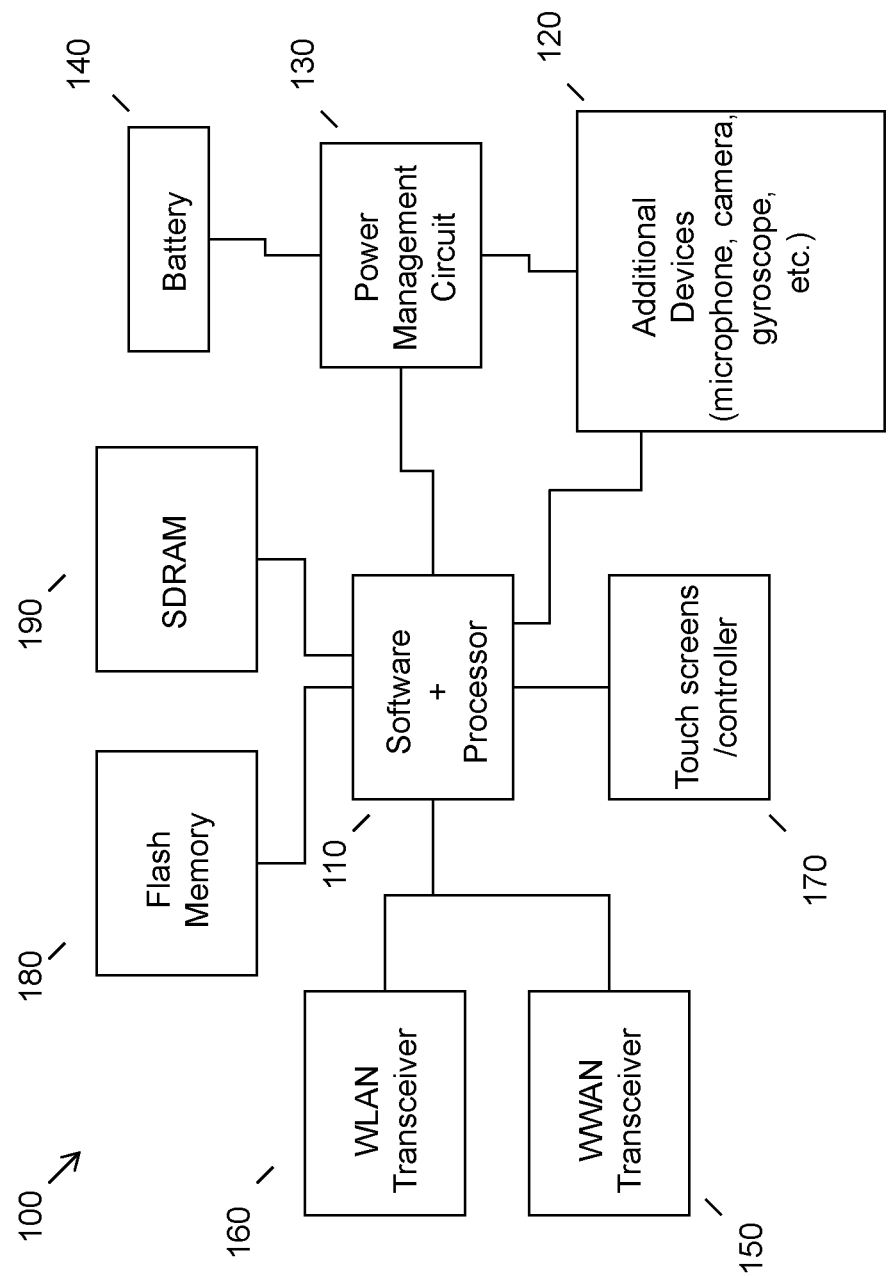
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Issues in audible input quality arise when a boom microphone is not properly positioned. For example, a user may rotate the microphone upwards to a vertical position when they do not want the microphone to capture any user input. Although this positioning is effective in preventing the microphone from capturing user input, users oftentimes forget to lower the microphone back down to an input providing position (e.g., when putting the headset back on, etc.). As another example, high quality voice capture from a boom microphone is highly dependent on the position of the boom microphone relative to a user's mouth. When the microphone is too close, breathing sounds and other unnecessary noises are likely to be picked up. Conversely, when the microphone is too far away, a user's audible input may not be properly registered and/or other unnecessary background noises may be captured. No solutions currently exist that notify a user that a boom microphone is not optimally positioned for input provision.

Accordingly, an embodiment provides a method for notifying a user about the position of the boom microphone. In an embodiment, a position of a microphone attached to a headset may be identified. More particularly, an embodiment may identify that the position of the microphone corresponds to a conventional audio input position (e.g., a lowered position, etc.). An embodiment may then determine whether the identified input position of the microphone is associated with an optimal audible input position. Responsive to determining that it is not, an embodiment may notify a user. For example, an embodiment may apprise the user of this fact (e.g., using an audible notification, a visual notification, etc.) and/or provide instructions explaining how the microphone position may be adjusted to reach the optimal audible input position. Such a method may ensure that the audio quality of captured audible input is high.

In another embodiment, a position of a boom microphone attached to a headset may be identified as being in the vertical, or "out-of-way", position. Responsive to this identification, an embodiment may perform a predetermined action. For example, an embodiment may activate a mute control and inform a user of this activation. As another example, an embodiment may notify a user of the vertical positioning of the microphone and inform the user that they need to adjust the positioning of the microphone if they want to provide input. Furthermore, if audible input signatures are detected when the microphone is in the out-of-way position, an embodiment may inform the user that the recently provided audible input was not transmitted. Such a method may ensure that a boom microphone is in an appropriate input accepting position prior to input provision.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet and/or PC circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
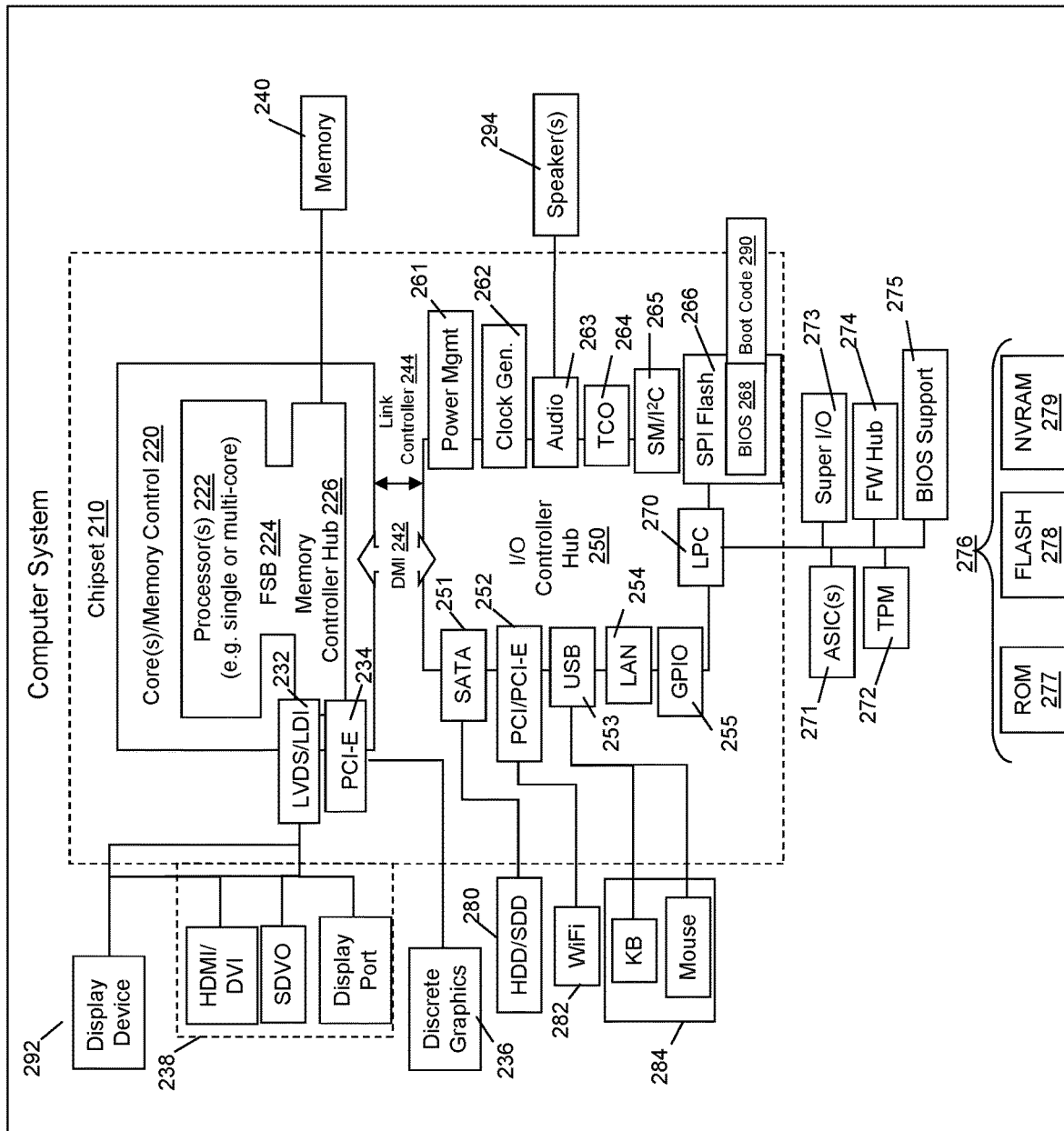
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

A headset of the embodiments may be used in conjunction with information handling device circuitry, as for example outlined in FIG. 1 or FIG. 2, which are capable of supporting the headset, processing information obtained by the microphone of the headset, and providing notification signals to the headset. For example, the circuitry outlined in FIG. 1 may be implemented in a smart phone or tablet embodiment, whereas the circuitry outlined in FIG. 2 may be implemented in a laptop.

Figure 3:
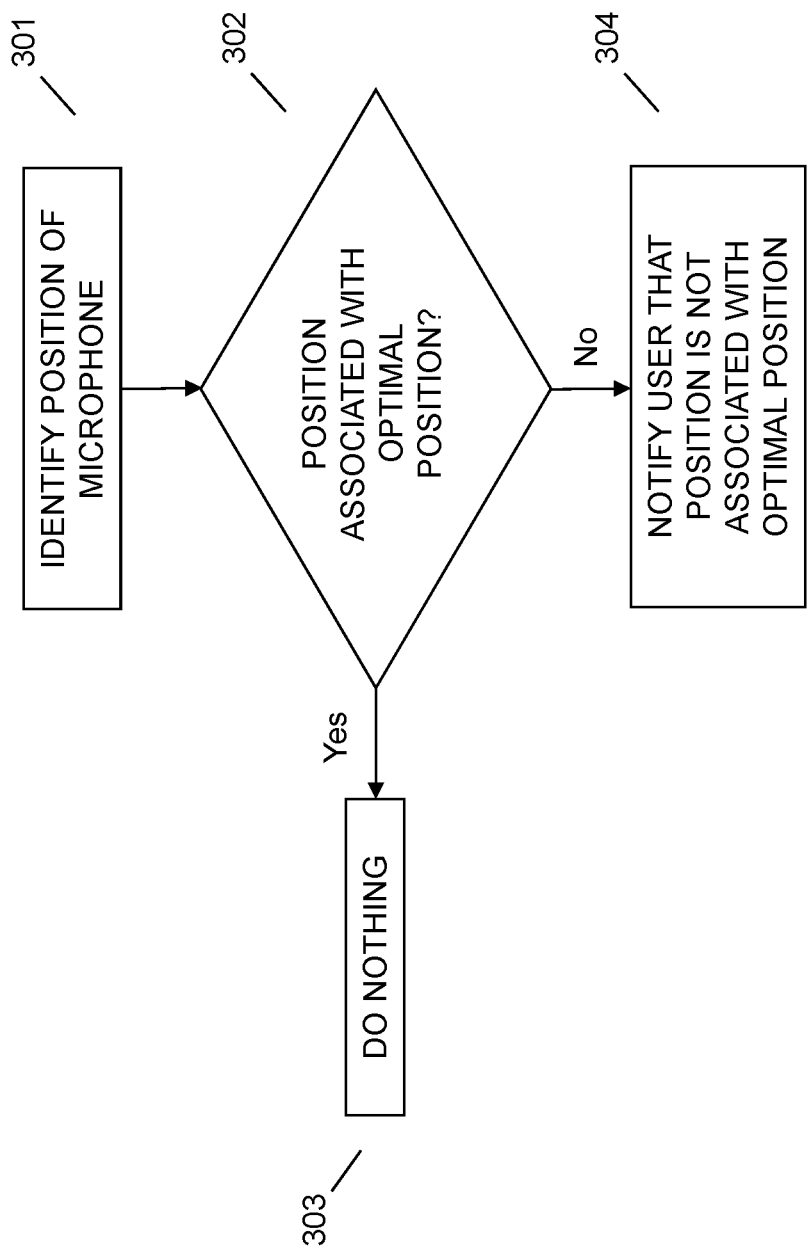
FIG. 3 illustrates an example method of notifying a user of a sub-optimal microphone position.

Referring now to FIG. 3, an embodiment may determine that a microphone is positioned in a sub-optimal input position and thereafter notify a user of this determination. At 301, an embodiment may identify that a microphone is positioned in an audible input position. For simplicity purposes, the microphone mentioned throughout this application may refer to a boom microphone integrated into a wearable headset. However, this designation is not limiting and a skilled person will realize that other microphone arrangements may also be applicable.

In an embodiment, a microphone may be in an audible input position when it is primed to receive voice input from a user. For example, a microphone may be in an audible input position by simply being active. Additionally or alternatively, for a microphone that may be adjusted to an "off position" or a "mute position" (e.g., a vertical position, an out-of-way position, etc.), the audible input position may correspond to a lowered position of the microphone. The physical position of the microphone may be identified by use of one or more conventional sensors or mechanisms (e.g., a switch, a potentiometer, another sensor or mechanism, etc.).

At 302, an embodiment may determine whether the identified position of the microphone at 301 is associated with an optimal audible input position ("optimal position"). In an embodiment, the optimal position may refer to a position of the microphone that is the best for clear voice capture. More particularly, an optimal position may refer to a position of the microphone at which the captured audible input most closely matches: the average audio characteristics of other individuals on a call, the average audio characteristics of previously provided user audio input, or a predetermined standard of audio quality. The foregoing concepts are further described and elaborated upon below.

In an embodiment, the determination may be conducted by comparing detected characteristics of audible input provided by the user with the audio characteristics associated with other individuals on a call. The characteristics may correspond to a volume of audible input, the clarity of audible input, the presence of additional noises in the audible input, a combination thereof, and the like. In an embodiment, values may be assigned to each detected and compared characteristic and a weighted value system may be utilized to make the final determination regarding whether the microphone is in the optimal position. More particularly, using the weighted system, an embodiment may conclude that the microphone is not in an optimal position if the values associated with one or more characteristics of the user's audible input do not share a predetermined level of similarity with the values associated with one or more audio characteristics of input provided by other individuals on the call. As a non-limiting example of the foregoing, an embodiment may determine that a microphone is too far away from the user if the user's audible input is significantly lower than others and/or if there is significant background noise compared to the audio of others. In another example, an embodiment may determine that a microphone is too close to the user if the user's audible input is significantly higher than others.

In an embodiment, the determination may be conducted by comparing the detected characteristic values of the user's audible input with previously captured and recorded characteristic values of the user's audible input. More particularly, an embodiment may not necessarily store the actual content of the previous calls, but rather, just the weighted value of the characteristics. Using this technique, an embodiment may conclude that the microphone is not in an optimal position if the values associated with one or more characteristics of the user's audible input do not share a predetermined level of similarity with the values associated with one or more previously recorded characteristics. As a non-limiting example of the foregoing, an embodiment may determine that a microphone is too far away from the user if the user's audible input is significantly lower than in previous calls and/or if there are significant background noises than in previous calls. In another example, an embodiment may determine that a microphone is too close to the user if the user's audible input is significantly higher than in previous calls.

An embodiment may only compare the characteristic values associated with the user's audible input to select audio streams, or select audio recordings, described in the previous determination techniques. Stated differently, only audio streams or audio recordings with a weighted characteristic value greater than a predetermined threshold may be utilized for the comparison process. Such a requirement may ensure that a user's audio input quality is judged against the audio input quality of "good" audio input streams. More particularly, if the audio provided by other individuals is poor, a user should not adjust their microphone to a position where their provided audio input is similarly poor.

In an embodiment, the determination may be conducted by detecting a breathing pickup pattern. More particularly, sounds of user breathing may be detected if a microphone is positioned too close to a user's mouth. Accordingly, an embodiment may be able to determine that the microphone is in a sub-optimal position if a predetermined breathing pattern is detected (e.g., repeated detection of breath inputs, the totality of which may correspond to a pattern that is associated with a user breathing, etc.).

Responsive to determining, at 302, that a microphone is associated with an optimal position, an embodiment may, at 303, take no additional action. Conversely, responsive to determining, at 304, that a microphone is not associated with an optimal position, an embodiment may, at 304, notify a user of this determination. For example, an embodiment may provide a notification to a user (e.g., an audible notification through speakers in the user's headset, a visual notification on a screen proximate to and visible by the user, a combination thereof, etc.) that their microphone is sub-optimally positioned. The notification may be discreet in that it will not be part of the voice or video call.

In an embodiment, the notification may comprise instructions regarding how the user may adjust their microphone until it is positioned at the optimal position. For example, if the detected characteristics of the audible input indicate that the microphone is positioned too far away, an embodiment may discreetly instruct the user to move the microphone closer. In an embodiment, the instructions may be continually provided until the characteristics detected from the user's audio input indicate that the microphone is at the optimal position (e.g., that it matches the audio characteristics of others on the call, that it matches previously recorded audio characteristics, etc.).

In addition to all of the foregoing, an embodiment may identify a most frequent position of the user's microphone during audible input provision. Stated differently, an embodiment may identify the most common physical position that a user prefers to keep their microphone set at while providing audible input. An embodiment may store the identified frequent position at an accessible storage location and transmit (e.g., periodically, upon receipt of an indication to transmit, etc.) knowledge of the identified frequent position to an outside source. For example, assuming appropriate user permissions have been granted, an embodiment may transmit frequent position data from a user, or a group of users, to a headset/microphone manufacturer.

Figure 4:
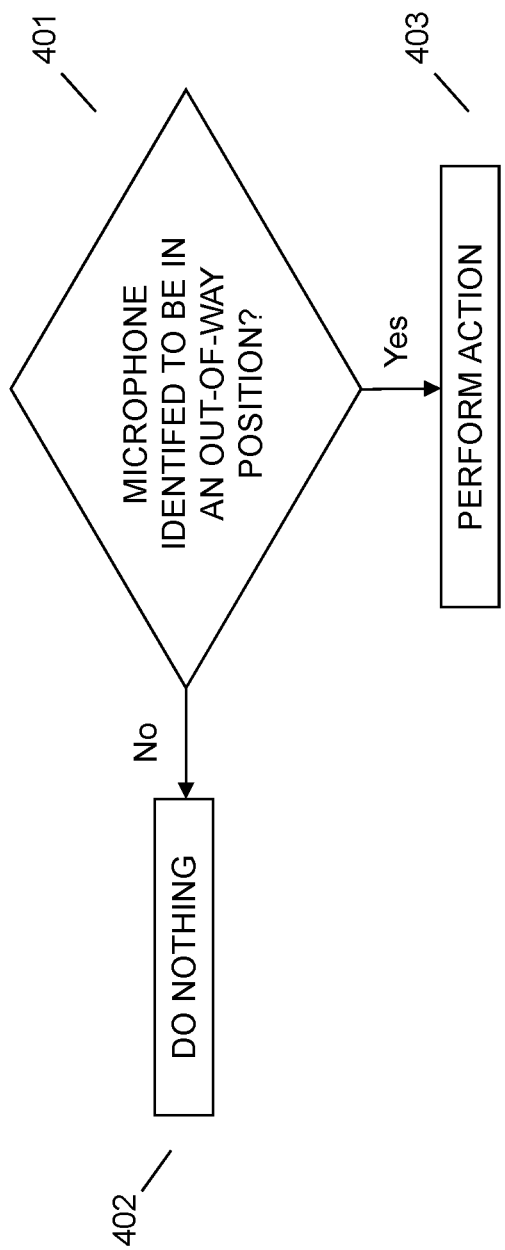
FIG. 4 illustrates an example method of notifying a user that a microphone is in an out-of-way position.

Referring now to FIG. 4, an embodiment may identify that a user's microphone is set to an out-of-way position and perform an action based on this identification. At 401, an embodiment may identify that a position of the microphone is associated with an out-of-way position. In the context of this application, an out-of-way position may refer to one or more of: a vertical positioning of the microphone, a mute positioning of the microphone, an otherwise idle positioning of the microphone that is not optimized for audible input provision.

In an embodiment, the physical position of the microphone may be identified by using one or more conventional mechanisms (e.g., a switch, a potentiometer, another mechanism, etc.). Additionally or alternatively, an embodiment may identify that the microphone is in the out-of-way position by receiving image data from another device. For example, a computer or smart phone a user is interacting with may have an integrated camera that is capable of capturing one or more images of the user's headset and determining, based on the detected positioning of the microphone in the images, whether the microphone is in the out-of-way position or not.

Responsive to detecting, at 401, that the microphone is not in the out-of-way position, an embodiment may, at 402, take no additional action. Additionally or alternatively, an embodiment may proceed with the processes previously described in 301-304 to ensure that the microphone is optimally positioned for audio input provision. Conversely, responsive to detecting, at 401, that the microphone is in the out-of-way position, an embodiment may, at 403, perform an action. For example, an embodiment may provide a notification to a user (e.g., an audible notification through speakers in the user's headset, a visual notification on a screen proximate to and visible by the user, a combination thereof, etc.) that their microphone is in the way out-of-way position and/or muted. Additionally or alternatively, an embodiment may provide the notification if audio input signals are detected while the microphone is identified as being in an out-of-way position.

The various embodiments described herein thus represent a technical improvement to conventional methods of notifying a user of the position of their microphone. For a microphone identified as being in an audible input position, an embodiment may determine whether the position is associated with an optimal position and, responsive to determining that it is not, notify the user. The notification may comprise one or more instructions explaining how the microphone may be adjusted by the user to the optimal position. For a microphone identified as being in an out-of-way position, an embodiment may perform one or more actions. For example, an embodiment may notify the user that the microphone is not in a suitable input position or that the microphone in the out-of-way position is muted. Such methods may apprise users of headset microphones as to the position of their microphones and/or to the quality of audio input that is being detected by the microphone.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, using at least one sensor, that a position of a microphone attached to a headset is associated with an audible input position;
   detecting, at the microphone, audible input from a user;
   determining, using a processor, that the position is not associated with an optimal audible input position, wherein the determining comprises:
   identifying that a weighted characteristic value of additional audible input provided by at least one other individual, engaged in a conversation with the user, is greater than a predetermined threshold; and determining that at least one detected characteristic of the audible input does not share a predetermined level of similarity with the at least one detected characteristic of additional audible input provided by the at least one other individual; and notifying, responsive to the determining, a user that the position is not associated with the optimal audible input position.

2. The method of claim 1, wherein the determining comprises determining that detected characteristics of audible input provided by the user do not share a predetermined level of similarity to characteristics of audible input previously provided by the user.

3. The method of claim 1, wherein the determining comprises detecting a breathing pickup pattern.

4. The method of claim 1, wherein the notifying comprises providing an instruction to the user to adjust the microphone to the optimal input position.

5. The method of claim 4, wherein the instruction is continually provided until the microphone is in the optimal input position.

6. The method of claim 1, further comprising identifying a most frequent position of the microphone and transmitting an indication of the most frequent position to an outside source.

7. The method of claim 1, wherein the notifying comprises providing a notification selected from the group consisting of: an audible notification, a visual notification, and a haptic notification.

* * * * *